(12) United States Patent
Hirata et al.

(10) Patent No.: US 7,017,885 B2
(45) Date of Patent: Mar. 28, 2006

(54) SOLENOID VALVE

(75) Inventors: Ichiro Hirata, Fujisawa (JP); Kazuaki Nagayoshi, Fujisawa (JP); Akira Ono, Fujisawa (JP); Makoto Hora, Fujisawa (JP); Yoshinari Kasagi, Fujisawa (JP)

(73) Assignee: NOK Corporation, Tokyo (JP)

( * ) Notice: Subject to any disclaimer, the term of this patent is extended or adjusted under 35 U.S.C. 154(b) by 50 days.

(21) Appl. No.: 10/390,173

(22) Filed: Mar. 18, 2003

(65) Prior Publication Data

US 2004/0041114 A1    Mar. 4, 2004

(30) Foreign Application Priority Data

Mar. 19, 2002    (JP)    ............... 2002-075538

(51) Int. Cl.
*F16K 31/02*    (2006.01)

(52) U.S. Cl. ............... 251/129.15; 137/315.03

(58) Field of Classification Search ........... 251/129.15; 310/14; 137/315.03; 29/593, 605, 603
See application file for complete search history.

(56) References Cited

U.S. PATENT DOCUMENTS

| | | | | |
|---|---|---|---|---|
| 3,295,079 A | * | 12/1966 | Brown | 251/129.19 |
| 4,520,227 A | * | 5/1985 | Krimmer et al. | 251/129.15 |
| 4,570,902 A | * | 2/1986 | Yew et al. | 251/129.15 |
| 4,582,294 A | * | 4/1986 | Fargo | 251/129.15 |
| 5,040,731 A | * | 8/1991 | Yokoyama et al. | 251/129.15 |
| 5,078,240 A | * | 1/1992 | Ackermann et al. | 251/38 |
| 5,289,841 A | * | 3/1994 | Maranzano | 251/129.15 |
| 6,119,966 A | * | 9/2000 | Wagner et al. | 251/129.15 |

* cited by examiner

*Primary Examiner*—Eric Keasel
(74) *Attorney, Agent, or Firm*—Jacobson Holman PLLC

(57) ABSTRACT

In the region in which a coil and a connector are provided, the leakage of a fluid to which coil and connector is prevented by a seal member, a passage extending from the seal member to a position in the vicinity of a terminal of the connector is formed. At the time of completion of the production of a solenoid valve assembly, an air-tightness test on the seal member can be conducted directly through the passage, so that the detection of damage to the seal member, the detection of bite into the seal member, the detection of a defect of the seal member and so on can be carried out at the time of completion of the production of the mentioned assembly. Namely, the detection of the sealability of the seal member is rendered possible.

2 Claims, 4 Drawing Sheets ated from the bracket 127 and extended in the radially outward direction. The collar portion 125*a*, bracket 127 and

SOLENOID VALVE

BACKGROUND OF THE INVENTION

1. Field of the Invention

This invention relates to a solenoid valve used to control the pressures of various kinds of fluids.

2. Description of the Related Art

The conventional art solenoid valves of this kind include, for example, a solenoid valve shown in FIG. 3. FIG. 3 is a sectioned schematic construction diagram of this conventional art solenoid valve.

A solenoid valve 101 includes a solenoid portion 102 and a valve portion 103.

Here, in the illustrated example, the valve portion 103 is a spool valve. In the interior of a valve sleeve 131, a spool 132 is provided so that the spool 132 can be reciprocatingly moved. Since a cross-sectional area of an opening of a valve formed in the valve sleeve 131 varies in accordance with a stroke of the spool 132, an inflow rate and an outflow rate of a fluid can be controlled through a control operation for a quantity of a stroke of the spool 132 by the solenoid portion 102.

The solenoid portion 102 is provided with a substantially cylindrical coil 121 adapted to generate a magnetic field when it is energized thereto, a movable plunger 122, a center post 123 adapted to magnetically attract the plunger 122 thereto when a magnetic path is formed by a magnetic field occurring owing to energizing the coil 121, and a rod 124 connected to the plunger 122 so as to transmit a driving force of the plunger 122 to the spool 132.

The solenoid portion 102 is further provided with a substantially bottomed cylindrical metal sleeve 125 packed with the plunger 122, opened at one end thereof which constitutes a bearing for the plunger 122, and closed at the other end thereof, an upper plate 126 interposed between the coil 121 and sleeve 125, and a bracket 127 having a mounting portion 127*a* to a predetermined portion of which a body of the solenoid valve 1 is fixed.

Next to the closed end of the sleeve 125, a connector 128 is provided which has a terminal 128*a* connected to the coil 121 via an electric wire 121*a*, so as to supply electric power to the coil 121.

A case member 129 is provided which houses therein various constituent members including the coil 121, plunger 122, center post 123, sleeve 125, bracket 127 and connector 128.

Furthermore, the solenoid portion 102 is provided with a bobbin 140 around which the coil 121 is wound, a shim 141 for rendering the plunger 122 easily separable from the center post 123, and a bearing 142 for the rod 124.

On the other hand, the valve portion 103 side is provided with a spring 134 which urges a metal member 133 fixed to the spool 132, in the direction in which the plunger 122 is separated with the spool 132 from the center post 123 via the rod 124.

The coil 121 and bobbin 140 are molded into one part to constitute a molded coil subassembly for the solenoid valve 101.

The solenoid valve 101 shown in FIG. 3 is so formed that a collar portion 125*a* is provided at an open end of the sleeve 125 so as to extend to a position near an inner circumferential surface of the case member 129. The collar portion 125*a* is curved in a position close to the bracket 127 to form a stepped portion, the collar portion 125*a* being then separated from the bracket 127 and extended in the radially outward direction. The collar portion 125*a*, bracket 127 and the inner circumferential surface of the case member 129 define a substantially annular space 150.

In this annular space 150, a seal member 104 is provided. The seal member 104 prevents the leakage of a fluid from the interior of the valve portion 103 into a region in which the coil 121 and connector 128 are provided, and the entry from the outside thereinto of contaminant, such as water which causes poor insulation or short-circuiting of the coil 121.

The operation of the solenoid valve 101 will now be described.

The plunger 122 is in a position away from the center post 123 in a normal condition, i.e., in the condition in which the coil 121 is not energized. During this time, the metal member 133 is urged by a spring 134 to cause the spool 132 to be pressed toward the solenoid portion 102. As a result, the rod 124 is forced into the solenoid portion 102, so that the plunger 122 is separated from the center post 123.

When the coil 121 is energized, a magnetic path (formed by the case member 129, upper plate 126, plunger 122, center post 123 and bracket 127) is formed around the coil 121, and the plunger 122 is magnetically attracted to the center post 123 against the urging force of the spring 134.

Therefore, the magnetic force is controlled in accordance with the level of an electric current supplied to the coil 121 and a flow rate of a fluid is thereby regulated by controlling a quantity of a stroke of the spool 132 on the basis of a quantity of movement of the plunger 122. The controlling of pressures of various kinds of fluids, such as the controlling of a hydraulic pressure is done in this manner.

SUMMARY OF THE INVENTION

In such a conventional art solenoid valve 101, a region to be sealed in which the coil 121 and connector 128 are provided is sealed with the seal member 104. At the time of completion of the production of a solenoid valve assembly, the a resin and a metal among parts in the region to be sealed adhere to one another, so that the sealing of the parts has been done even by members which are other than the seal member 104.

Therefore, even when an air-tightness test is conducted at the time of completion of the production of the solenoid valve assembly, it is difficult to examine the seal member 104 whether or not there are damage to, bite into and a defect of the seal member 104.

When this solenoid valve 101 is used on the market, heat history is applied thereto, and the adherent portions of the resin and metal among the parts in the region to be sealed peel off due to a differential thermal expansion to cause a clearance to occur. When there are damage to, bite into and a defect of the seal member 104, a leakage path B passing through a clearance between the coil 121 and case member 129, around the electric wire 121*a* and around the terminal 128*a* are formed as shown in FIG. 4, and the leakage of a fluid necessarily occurs.

The present invention has been made in view of these problems encountered in the above-described conventional art solenoid valve of this kind, and provides a solenoid valve capable of detecting the sealability of a seal member thereof at the time of completion of the production of the solenoid valve.

To achieve the objects of the present invention, the invention provides a solenoid valve having a center post adapted to magnetically attract a plunger thereto by a magnetic field generated by a coil, comprising a connector having a terminal connected to the coil by an electric wire and adapted to supply electric power to the coil, a seal member adapted to prevent the leakage of a fluid to a region in which the coil and connector are provided, and a passage extending from the seal member to a position in the vicinity of the terminal of the connector in the region in which the coil and connector are provided, the leakage of the fluid to which coil and connector is prevented by the seal member.

The invention further provides a solenoid valve comprising a coil adapted to generate a magnetic field when an electric current is supplied thereto; a sleeve provided on a radially inner side of the coil, having an outwardly directed collar portion at one end thereof being an open end and closed at the other end thereof; a plunger movable at the other end of the sleeve closed in the interior thereof; a center post provided on the side of the open end of the sleeve and adapted to magnetically attract the plunger by a magnetic field generated by the coil; a plate, to which the center post is fixed, extending in parallel with the collar portion of the sleeve in the radially outward direction; a connector provided adjacently to the other end of the sleeve closed, and having a terminal connected to the coil by an electric wire so as to supply electric power to the coil; a case adapted to close the radially outer sides of the collar portion of the sleeve and plate, and thereby form an annular space between the collar portion of the sleeve and the plate of the sleeve; a seal member provided in the annular space sealing a clearance between the collar portion of the sleeve and case and adapted to prevent the leakage of the fluid to a region in which the coil and connector are provided; and a passage extending from the seal member to a position in the vicinity of the terminal of the connector in the region in which the coil and connector are provided, the leakage of the fluid to which the coil and connector is prevented by the seal member, are provided.

In this structure, an air-tightness test on a seal member can be conducted at the time of completion of the production of a solenoid valve assembly directly through a passage formed in a region in which a coil and a connector are provided, the leakage of a fluid to which is prevented by the seal member, are provided. At the time of completion of the production of the solenoid valve, it is possible to detect the presence of damage to, bite into and a defect of the seal member, and the sealability of the seal member.

When the connector is joined to a waterproof connector of an object apparatus, the space in the vicinity of the terminal of the connector is sealed off the outside. This can prevent during the use of the solenoid valve the entry of water and etc. from the side of the connector into the passage.

DETAILED DESCRIPTION OF THE PREFERRED EMNBODIMENT

Figure 1:
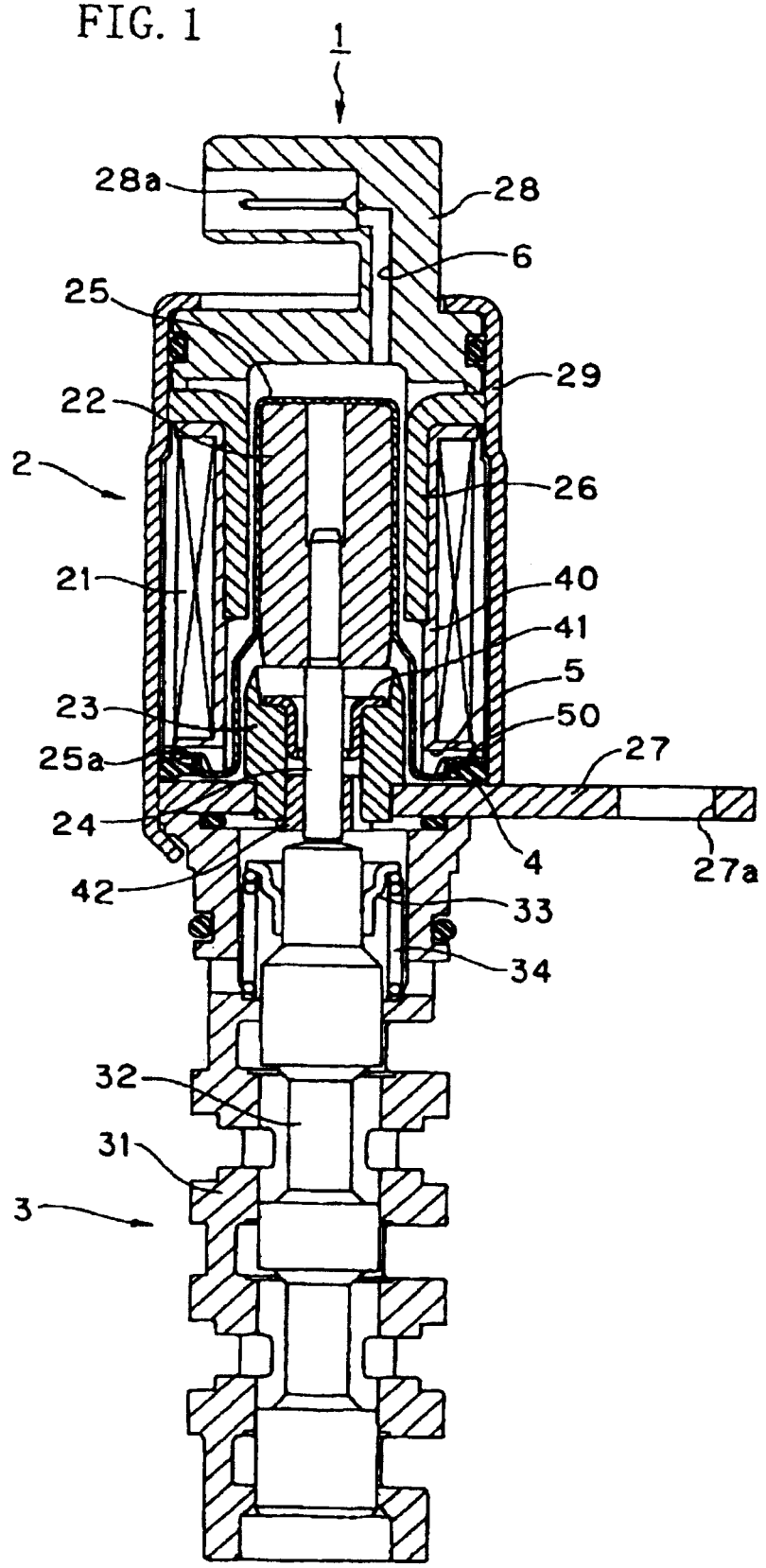
FIG. 1 is a sectioned schematic construction diagram showing a mode of embodiment of the solenoid valve.
Figure 2:
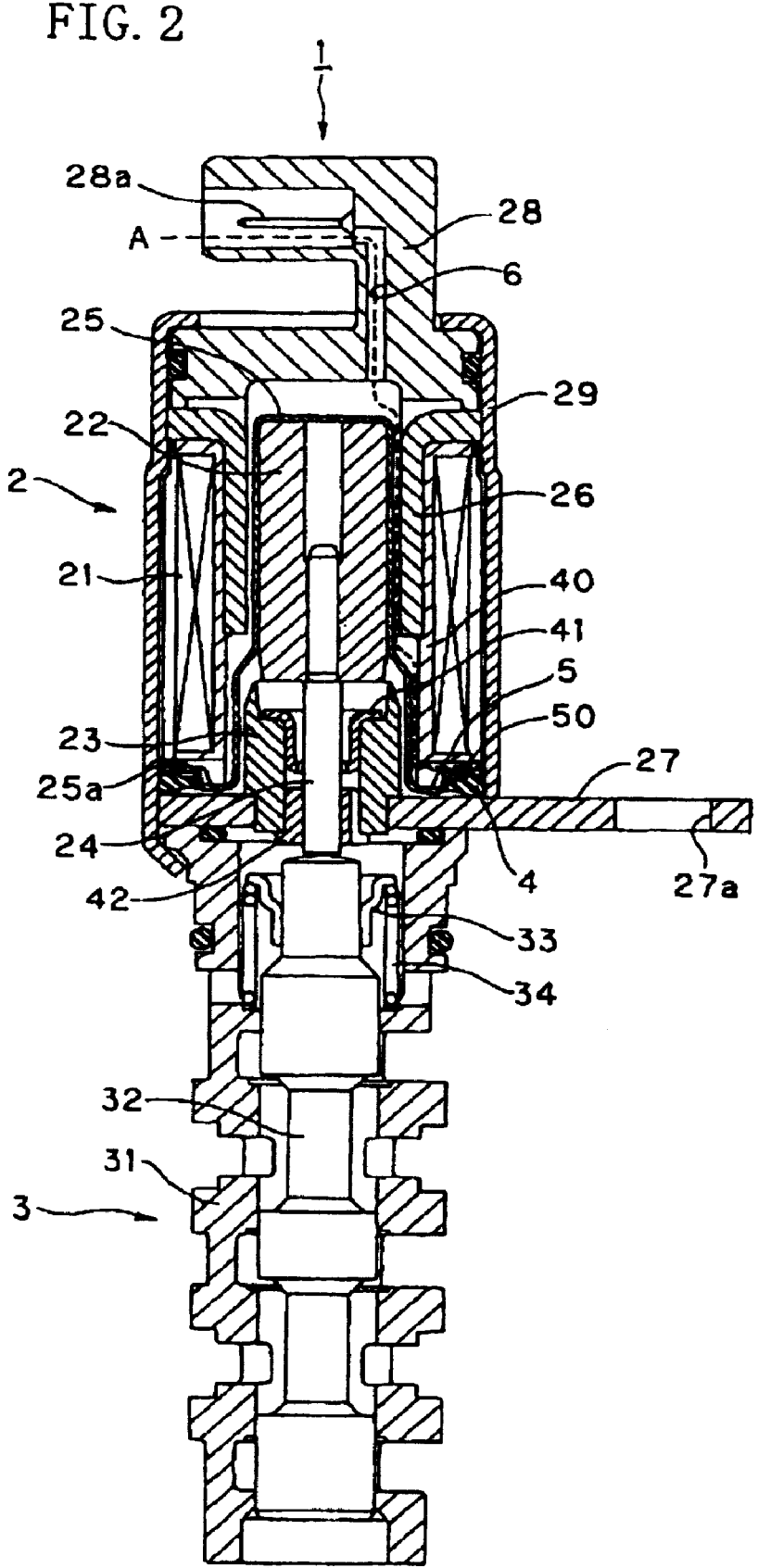
FIG. 2 is a sectioned schematic construction diagram of the mode of embodiment of the solenoid valve, showing a passage reaching a seal member.
Figure 3:
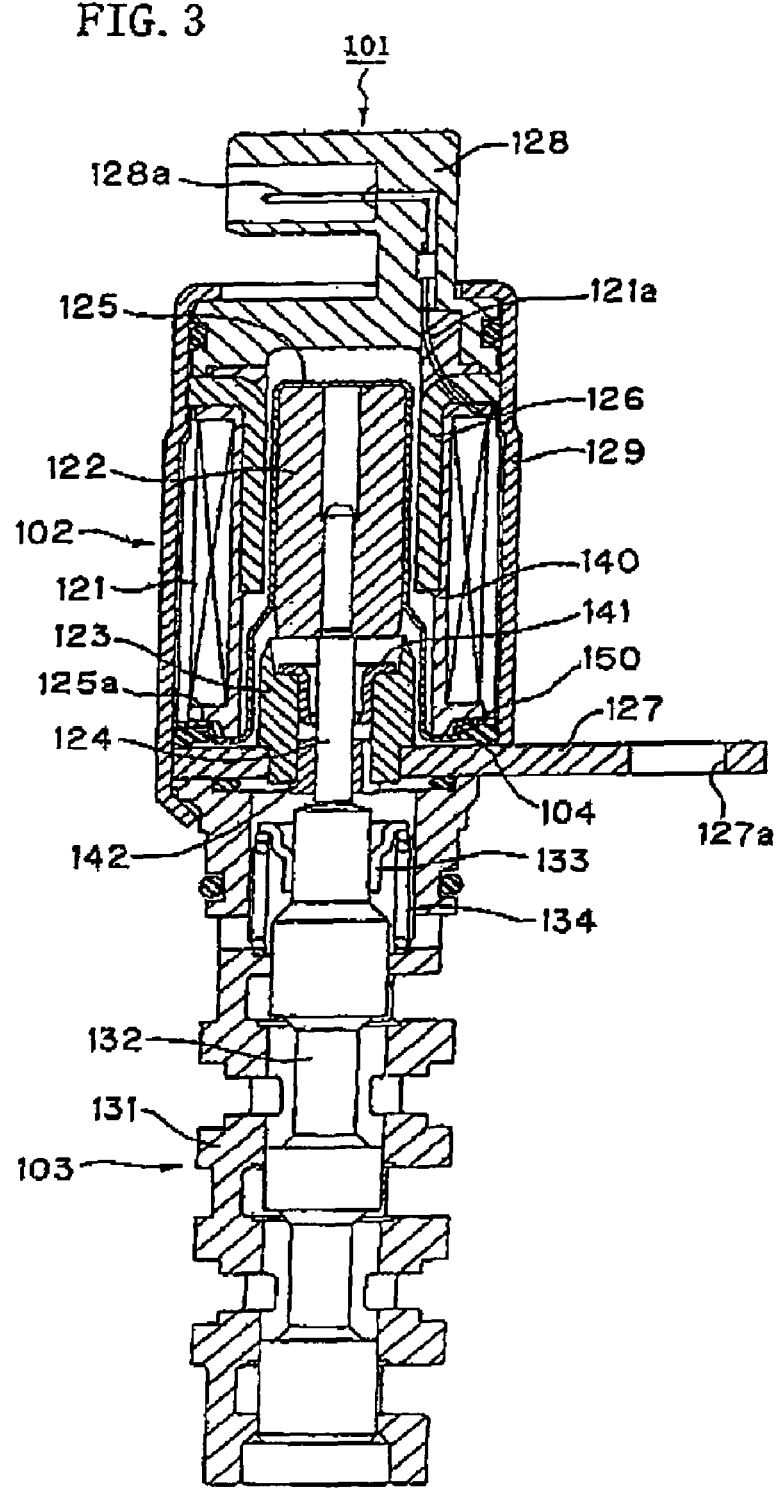
FIG. 3 is a sectioned schematic construction diagram showing a conventional art solenoid valve.
Figure 4:
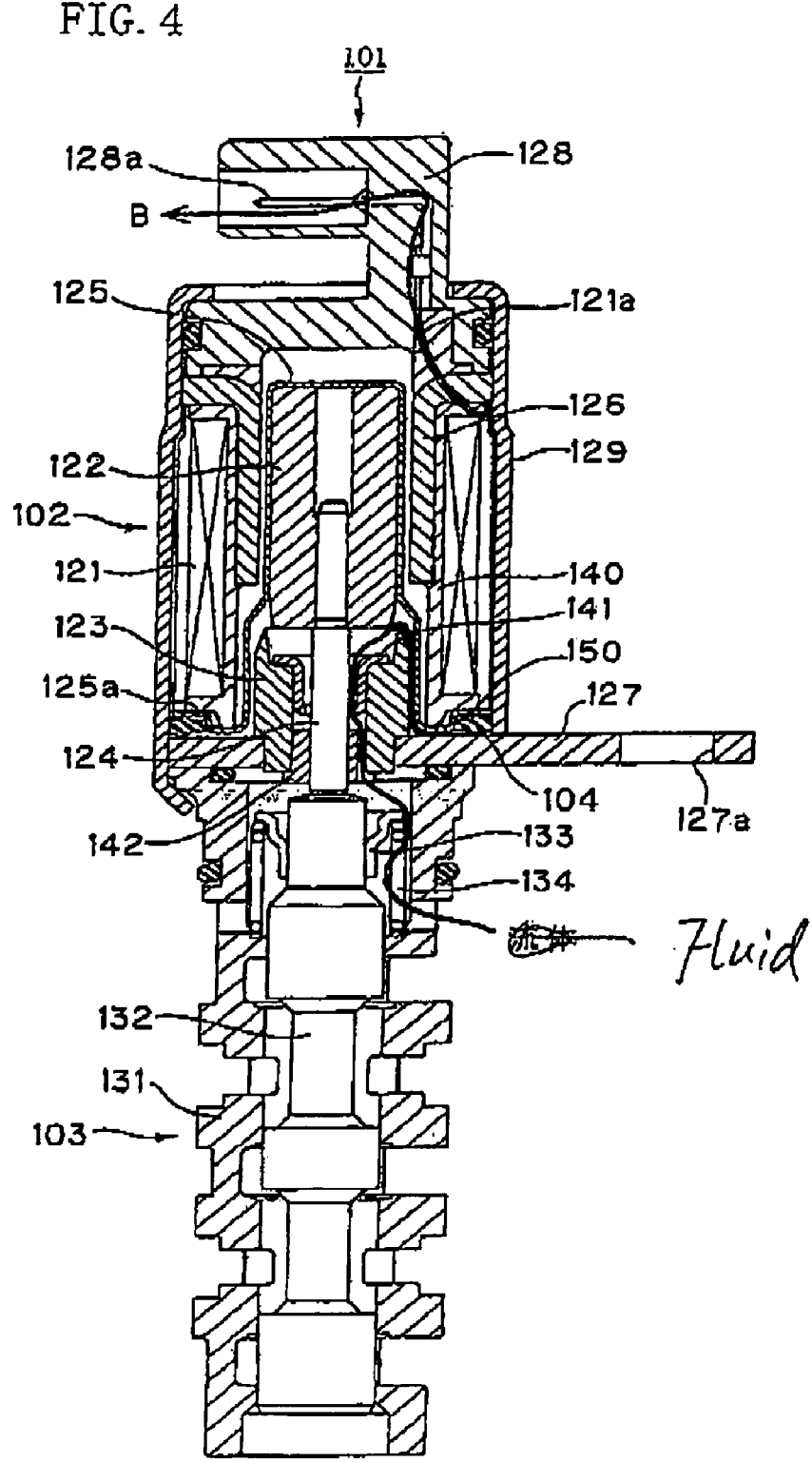
FIG. 4 is a sectioned schematic construction diagram of the conventional art solenoid valve, showing a leakage path.

An embodiment of the solenoid valve according to the present invention will be described with reference to FIGS. 1 to 2. FIG. 1 is a sectioned schematic construction diagram of the embodiment of the solenoid valve. FIG. 2 is a sectioned schematic construction diagram of the embodiment of the solenoid valve, showing a passage reaching a seal member.

A solenoid valve 1 includes a solenoid portion 2 and a valve portion 3.

Here, in the illustrated example, the valve portion 3 is a spool valve. In the interior of a valve sleeve 31, a spool 32 is provided so that the spool 32 can be reciprocatingly moved. Since a cross-sectional area of an opening of a valve formed in the valve sleeve 31 varies in accordance with a stroke of the spool 32, an inflow rate and an outflow rate of a fluid can be controlled through a control operation for a quantity of a stroke of the spool 32 by the solenoid portion 2.

The solenoid portion 2 is provided with a substantially cylindrical coil 21 adapted to generate a magnetic field when it is energized thereto, a movable plunger 22, a center post 23 adapted to magnetically attract the plunger 22 thereto when a magnetic path is formed by the magnetic field occurring owing to energizing the coil 21, and a rod 24 connected to the plunger 22 so as to transmit a driving force of the plunger 22 to the spool 32.

The solenoid portion 2 is further provided with a substantially bottomed cylindrical metal sleeve 25 packed with the plunger 22, opened at one end thereof which constitutes a bearing for the plunger 22, and closed at the other end thereof, an upper plate 26 interposed between the coil 21 and sleeve 25, and a bracket 27 as a plate having a mounting portion 27a to a predetermined portion of which a body of the solenoid valve 1 is fixed.

The sleeve 25 is provided on the inner diameter side of the coil 21, and has an outwardly directed collar portion 25a at one end thereof, i.e., at an open end thereof. The plunger 22 is provided in the portion of this sleeve 25 which is at the other end thereof, i.e., at a closed (bottom) end thereof.

The bracket 27 to which the center post 23 is fixed extends in the radially outward direction.

Next to the closed end of the sleeve 25, a connector 28 is provided which has a terminal 28a connected to the coil 21 by an electric wire, so as to supply electric power to the coil 21.

A case member 29 is provided which houses therein various constituent members including the coil 21, plunger 22, center post 23, sleeve 25, bracket 27 and connector 28.

Furthermore, the solenoid portion 102 is provided with a bobbin 40 around which the coil 21 is wound, a shim 41 for rendering the plunger 22 easily separable from the center post 23, and a bearing 42 for the rod 24.

On the other hand, the valve portion 103 side is provided with a spring 34 which urges a metal member 33 fixed to the spool 32, in the direction in which the plunger 22 is separated with the spool 32 from the center post 23 via the rod 24.

The coil 21 and bobbin 40 are molded into one part to constitute a molded coil subassembly for the solenoid valve 1.

The solenoid valve 1 shown in FIG. 1 is so formed that the collar portion 25a is provided at the open end of the sleeve 25 so as to extend to a position near an inner circumferential surface of the case member 29. The collar portion 25a is curved in a position close to the bracket 27 to form a stepped portion, the collar portion 25a being then separated from the bracket 27 and extended in parallel therewith in the radially outward direction. The collar portion 25a, bracket 27 and an inner circumferential surface of the case member 29, which closes radially outer sections of the collar portion 25a and bracket 27, define a substantially annular space 50.

In this annular space 50, a seal member 4 is provided. The seal member 4 prevents the leakage of a fluid from the interior of the valve portion 3 into a region in which the coil 21 and connector 28 are provided, and the entry from the outside thereinto of contaminant, such as water which causes poor insulation or short-circuiting of the coil 21.

In the region provided with the coil 21 and connector 28, the leakage of a fluid to which is prevented by the seal member 4, a passage A extending from the seal member 4 to a position in the vicinity of the terminal 28a of the connector 28 is provided.

The passage A is as shown in FIG. 2, and includes a slit 5 extending from an outer side to an inner side of the bobbin 40 adjacent to the collar portion 25a, a space between the bobbin 40 and sleeve 25, a space between the upper plate 26 and sleeve 25, a space between the connector 28 and closed end of the sleeve 25 and a through hole 6 extending along the terminal 28a of the connector 28.

Since the bobbin 40 adjacent to the collar portion 25a is in contact therewith, a part of the bobbin 40 is shaved off, and the slit 5 is thereby formed.

The through hole 6 of the connector 28 extends therethrough from the interior thereof to a position in the vicinity of the terminal 28a, and communicates with the outside in the vicinity of the terminal 28a.

Therefore, the passage A extends from the seal member 4 directly to the portion of the outside which is in the vicinity of the terminal 28a of the connector 28.

The operation of the solenoid valve will now be described.

The plunger 22 is in a position away from the center post 23 in a normal condition, i.e., in the condition in which the coil 21 is not energized. During this time, the metal member 33 is urged by the spring 34 to cause the spool 32 to be pressed toward the solenoid portion 2. As a result, the rod 24 is forced into the solenoid portion 2, so that the plunger 22 is separated from the center post 23.

When the coil 21 is energized, a magnetic path (formed by the case member 29, upper plate 26, plunger 22, center post 23 and bracket 27) is formed around the coil 21, and the plunger 22 is magnetically attracted to the center post 23 against the urging force of the spring 34.

Therefore, the magnetic force is controlled in accordance with the level of an electric current supplied to the coil 21, and a flow rate of a fluid is thereby regulated by controlling a quantity of a stroke of the spool 32 on the basis of a quantity of movement of the plunger 22. The controlling of pressures of various kinds of fluids, such as the controlling of a hydraulic pressure is done in this manner.

In the structure shown in FIG. 1, the plunger is borne by a method different from that by which a plunger in a general solenoid valve is borne, i.e., the plunger of FIG. 1 is not borne at both end portions thereof. In the structure of FIG. 1, the plunger 22 is borne by the sleeve 25. Therefore, the number of members (five members including the plunger 22, rod 24, center post 23, sleeve 25 and bearing 42 for the rod 24) concerning a centering operation is comparatively small. Accordingly, the solenoid valve has the advantage of reducing a dimension management load and miniaturizing the parts provided in the axial direction thereof as compared with a solenoid valve in which bearing structures are needed at both end portions of a plunger.

In the solenoid valve 1 described above, the air-tightness test on the seal member 4 can be conducted at the time of completion of the production of a solenoid valve assembly directly through the passage A formed in the region in which the coil 21 and connector 28 are arranged the leakage of a fluid to which is prevented by the seal member 4. Namely, at the time of completion of the production of such an assembly, the detection of damage to, bite in and a defect of the seal member 4, i.e. the sealability thereof can be carried out.

The air-tightness test may be conducted at the time of the completion of the production of a solenoid valve assembly by blowing a gas from an outside position close to the terminal 28a of the connector 28 directly into the solenoid valve 1 through the passage A with the solenoid valve 1 immersed in the water. The sealability of the seal member 4 may be detected by checking the leakage of the gas from the side of the valve portion 3.

The space in the vicinity of the terminal 28a of the connector 28 with which the passage communicates is exposed to the outside but, when the connector is joined to a waterproof connector of an object apparatus, the space in the vicinity of the terminal 28a is sealed off the outside. This can prevent during the use of the solenoid valve the entry of water and etc. from the side of the connector 28 into the passage A.

Therefore, the occurrence of short-circuiting and a decrease in insulation resistance of the coil 21 which cause the entry of water and etc. from the side of the connector 28 into the passage A can be prevented.

A preferred example of application of an embodiment of the solenoid valve 1 will now be described.

In an engine of an automobile, the opening and closing of suction and exhaust valves therefor are done in accordance with the rotation of a camshaft. Controlling properly the timing of an operation of the valve in accordance with the operating condition (high- and low-speed operations) of the engine enables the fuel consumption to be improved, and a high exhaust gas purification rate to be attained.

The controlling of the timing of the operation of this valve can be done by changing the phase by shifting the camshaft in the rotational direction thereof, and this operation carried out by a solenoid valve is widely spread as known techniques.

In order to shift the camshaft in the rotational direction thereof, a hydraulic pressure control operation by the solenoid valve is necessarily carried out. In view of the installation space, setting a solenoid valve on the path of the engine oil and thereby utilizing the engine oil constitute general techniques.

Although two types of operating conditions including high- and low-speed operating conditions of an engine have heretofore been controlled separately by using a solenoid valve adapted to carry out on-off control operations, a solenoid valve capable of carrying out a linear control operation has come to be used in recent years so as to attain more highly accurate control operations.

The above-described solenoid valve in the embodiment of the present invention can be suitably used as a linear control solenoid valve for such valve timing control (VTC) operations.

As described above, the present invention is capable of conducting an air-tightness test on a seal member at the time of completion of a solenoid valve assembling operation directly through a passage formed in a region in which a coil and a connector are provided, the leakage of a fluid to which coil and connector is prevented by the seal member. Namely, at the time of completion of the production of the mentioned assembly, damage to, bite into and a defect of the seal member can be detected, i.e., the sealability of the seal member can be detected.

What is claimed is:

1. A solenoid valve comprising:
   a coil adapted to generate a magnetic field when an electric current is supplied thereto;
   a sleeve provided on a radially inner side of the coil, having an outwardly directed collar portion at one end thereof being an open end and closed at the other end thereof,
   a plunger movable at the portion of the interior of the sleeve which is on the side of the other end of the sleeve closed in the interior thereof;
   a center post provided on the side of the open end of the sleeve and adapted to magnetically attract the plunger by a magnetic field generated by the coil;
   a plate, to which the center post is fixed, extending in parallel with the collar portion of the sleeve in the radially outward direction;
   a connector provided adjacently to the other end of the sleeve closed, and having a terminal connected to the coil by an electric wire so as to supply electric power to the coil;
   a case adapted to close the radially outer sides of the collar portion of the sleeve and plate, and thereby form an annular space between the collar portion of the sleeve and the plate;
   a seal member provided in the annular space sealing a clearance between the collar portion of the sleeve and case and adapted to prevent the leakage of the fluid to a region in which the coil and connector are provided; and
   a passage extending from the seal member to a position in the vicinity of the terminal of the connector in the region in which the coil and connector are provided to prevent the leakage of the fluid by the seal member, the passage being made for conducting the air-tightness test on the seal member.

2. A solenoid valve comprising:
   a coil adapted to generate a magnetic field when an electric current is supplied thereto;
   a sleeve provided on a radially inner side of the coil, having an outwardly directed collar portion at one end thereof being an open end and closed at the other end thereof;
   a plunger movable at the portion of the interior of the sleeve which is on the side of the other end of the sleeve closed in the interior thereof;
   a center post provided on the side of the open end of the sleeve and adapted to magnetically attract the plunger by a magnetic field generated by the coil;
   a connector provided adjacently to the other end of the sleeve closed, and having
   a terminal connected to the coil by an electric wire so as to supply electric power to the coil;
   a case adapted to close the radially outer sides of the collar portion of the sleeve and body, and thereby form an annular space between the collar portion of the sleeve and the body;
   a seal member provided in the annular space sealing a clearance between the collar portion of the sleeve and case and adapted to prevent the leakage of the fluid to a region in which the coil and connector are provided; and
   a passage extending from the seal member to a position in the vicinity of the terminal of the connector in the region in which the coil and connector are provided to prevent the leakage of the fluid by the seal member, the passage being made for conducting the air-tightness test on the seal member.

* * * * *